Dec. 9, 1969  J. HALLER  3,482,865
COMPOSITE SINTERED POWDERED MATERIAL WORKPIECE
Original Filed April 16, 1964
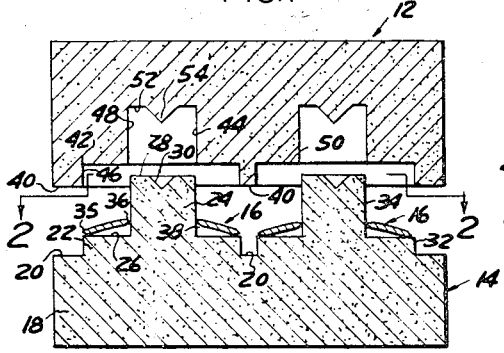
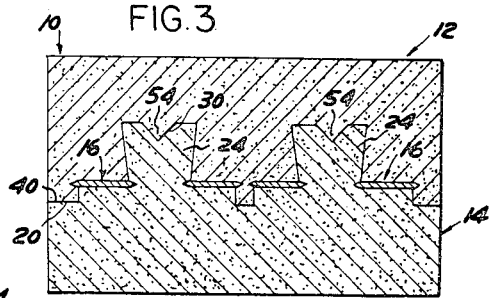
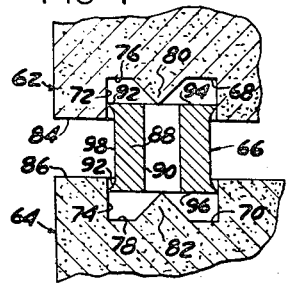
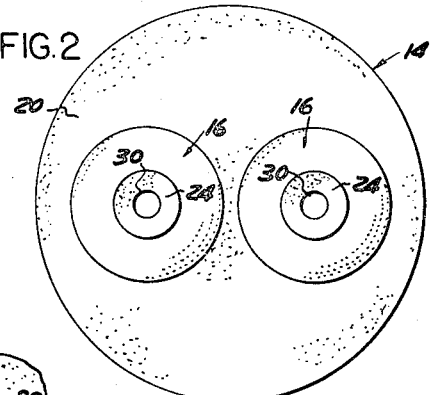
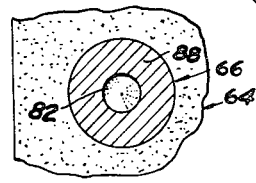
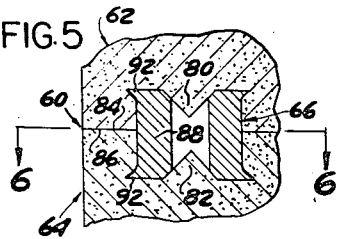
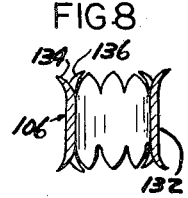
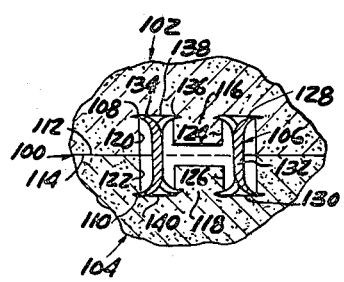
INVENTOR.
JOHN HALLER
BY Barthel & Bugbee
ATTORNEYS

# United States Patent Office 3,482,865
Patented Dec. 9, 1969

3,482,865
**COMPOSITE SINTERED POWDERED MATERIAL
WORKPIECE**
John Haller, Northville, Mich., assignor, by mesne assignments, to Federal-Mogul Corporation, a corporation of Michigan
Application Apr. 16, 1964, Ser. No. 360,376, now Patent No. 3,341,932, dated Sept. 19, 1967, which is a division of application Ser. No. 607,825, Jan. 6, 1967, now Patent No. 3,415,555, dated Dec. 10, 1968. Divided and this application Nov. 12, 1968, Ser. No. 775,084
Int. Cl. F16b *3/00*
U.S. Cl. 287—189.36   6 Claims

ABSTRACT OF THE DISCLOSURE

Two sintered powdered metal components to be united are provided with cylindrical sockets in their facing surfaces, these sockets having central conical protuberances projecting toward one another. Into the sockets are inserted the sharp outwardly-projecting opposite ends of a hollow cylindrical or tubular coupling member. When the components are pressed into engagement with one another along their facing surfaces, the conical protuberances simultaneously enter the central bore of the tubular coupling member and expand its opposite ends so that the sharp edges thereof penetrate the side walls of the sockets and permanently units the components.

---

This application is a division of application Ser. No. 607,825 filed Jan. 6, 1967 for Composite Sintered Powdered Material Workpiece, now Patent No. 3,415,555 which was in turn a division of application Ser. No. 360,376, filed on Apr. 16, 1964, for Method of Mechanically-Uniting Sintered Powdered Metal Parts, now Patent No. 3,341,932.

BACKGROUND OF THE INVENTION

Hitherto, it has frequently been inconvenient or impossible to manufacture a complex workpiece by powder metallurgy because of the difficulty or impossibility of molding the powdered metal or other sinterable powdered material, such as powdered nylon, to form the required briquette which is subsequently sintered to form the part. The present invention solves this problem by providing a simple and effective method of uniting component parts which can be separately made by powder metallurgy and subsequently joined to produce the required complex workpiece, as a composite workpiece.

In the drawings,

FIGURE 1 is a central vertical section through a pair of component parts formed in accordance with the present invention and about to be pressed together into interlocking relationship with the aid of a coupling member;

FIGURE 2 is a top plan view of the lower component part of FIGURE 1, taken along the line 2—2 therein;

FIGURE 3 is a central vertical section through the composite workpiece formed by interlocking the component part of FIGURE 1 and the coupling members thereof;

FIGURE 4 is a fragmentary vertical section through a modification of the invention shown in FIGURE 1, showing an elongated laterally expandable coupling member in position prior to pressing the parts together into interlocking relationship;

FIGURE 5 is a view similar to FIGURE 4 but showing the parts and coupling members pressed together into interlocking relationship;

FIGURE 6 is a horizontal section through the junction plane of the component parts of FIGURE 5, taken along the line 6—6 therein;

FIGURE 7 is a fragmentary vertical section through a further modification of the invention, showing an elongated coupling member which has been expanded radially inward and outward to interlock the component parts;

FIGURE 8 is a central vertical section through the coupling member, before deformation, used in the further modification shown in FIGURE 7; and FIGURE 9 is a top plan view of FIGURE 8.

Referring to the drawing in detail, FIGURE 3 shows a composite workpiece, generally designated 10, formed by a pair of component joining parts, generally designated 12 and 14, shown in FIGURE 1 before assembling with the aid of coupling members, generally designated 16. The parts 12 and 14 are formed by molding briquettes of sinterable powdered material, such as powdered metal or powdered nylon, by the use of suitably shaped punches and dies in a conventional briquetting press, after which they are sintered to cause the particles to coalesce and become integral porous masses or bodies. The production of such parts is well known to those skilled in the powder metallurgy art and hence requires no further explanation. To simplify the disclosure, the component parts 12 and 14 have been shown as simple cylindrical blocks, whereas in actual practice, these parts would be of such complex external shapes as to be incapable of molding in a joined unit but capable of molding separately, such being the principal purpose of the present invention.

The lower part 14 consists of a main body 18 having contact surface or junction surface 20 from which rise outer bosses or elevations 22 joined to central upstanding approximately cylindrical inner bosses or projections 24 by annular shoulders 26. The bosses 22 and 24 are disposed in spaced relationship with one another on the junction surface 20 (FIGURE 2) and are two or more in number, so as to interconnect the component parts 12 and 14 at two or more separated locations. The inner bosses 24 have flat tops 28 surrounding central conical indentations 30. The outer and inner bosses 22 and 24 have cylindrical side surfaces 32 and 34.

Mounted on the outer bosses 22 and encircling the inner bosses 24 are the coupling members 16 in the form of convexo-concave washers having sharp outer edges 35 and sharp inner edges 36 around a central hole 38. The hole 38 is sufficiently large to receive the inner boss 24 with a minimum clearance therebetween so that subsequent pressure upon the coupling member 16 will deform it so as to spread radially inward and outward beyond the inner and outer edges of the top surface 26 of the outer boss 22. For this purpose, the coupling members or washers 16 are of diameters slightly less than the diameters of the outer bosses 22, also with a minimum difference in these diameters to as to acquire the minimum deformation of the coupling members 16 before indentation of the adjacent portion occurs.

The upper component part 12 is the counterpart of the lower component part 14 and for this purpose is provided with a contact or junction surface 40 containing outer and inner sockets 42 and 44 disposed in alignment with the outer and inner bosses 22 and 24 and having internal surfaces 46 and 48 of heights substantially equal to the heights of the side surfaces 32 and 34 with annular radial bottom surfaces 50 extending therebetween. The inner sockets 48 have flat bottom surfaces 52 from which central conical wedging protuberances 54 project.

In the assembling of the parts 12 and 14 to form the composite workpiece 10 of FIGURE 3, the sharp-edged washers or coupling members 16 are dropped over their respective inner bosses 24. The parts 12 and 14 are then placed in a conventional press and aligned with one another as shown in FIGURE 1. The press platen is then caused to descend, pushing the part 12 downward upon the part 14, causing the outer and inner bosses 22 and 24 to enter the outer and inner sockets 42 and 44. When the bottom surfaces 50 of the outer sockets 42 encounter the convexo-concave washers or coupling members 16, the latter are flattened out upon the surfaces 26 as anvils, causing their sharp outer and inner edges 35 and 36 to penetrate the side surfaces 46 and 34 of the outer sockets 42 and inner bosses 24 respectively in the manner shown in FIGURE 3. At the same time, the wedging protuberances 54 enter the slightly smaller protuberances 30 and enlarge them, consequently deforming and enlarging the ends and top surfaces 28 of the inner bosses 24 in rivet-like fashion, consequently deforming and enlarging the bottom portions of the inner sockets 44, with the result shown in FIGURE 3 of interlocking the now roughly conical inner bosses 24 and sockets 44 in joints which in central vertical section resemble dovetail joints. The component parts 12 and 14 are now firmly and solidly interlocked as shown in FIGURE 3.

In the modified construction shown in FIGURES 4, 5 and 6, a composite workpiece, generally designated 60, is produced from upper and lower component parts 62 and 64 also formed from sintered powdered material in a manner similar to that described above, and joined with the aid of an elongated tubular coupling member 66. The upper and lower component parts 62 and 64 are provided with sets of upper and lower aligned sockets 68 and 70 having cylindrical side surfaces 72 and 74 and annular bottom surfaces 76 and 78 from which project conical wedging protuberances 80 and 82 respectively. The sets of sockets 68 and 70 are spaced apart from one another in the manner shown in FIGURE 2 in contact surfaces 84 and 86 respectively.

Each coupling member 66, of which only one is shown, consists of a hollow tubular body 88 containing a central bore 90 and having outwardly-projecting sharp annular ridges 92 adjacent its top and bottom surfaces 94 and 96. The bore 90 is of smaller diameter than the base diameters of the conical protuberances 80 in order to effect spreading of the coupling members 66 at top and bottom, as described below, the midportion of the outer surface 98 remaining approximately constant in diameter.

In the assembly of the upper and lower component parts 62 and 64 to form the composite workpiece 60, the parts 62 and 64 are placed in alignment in a press, as described above in connection with FIGURE 1, with the coupling members 66 placed in the aligned sockets 68 and 70. The press is then operated to cause the upper part 62 to move into engagement with the lower part 64 in the manner shown in FIGURE 5, whereupon the wedging protuberances 80 and 82 enter the upper and lower ends of the smaller diameter bore 90 in the coupling member 66, expanding the upper and lower ends thereof and forcing the sharp upper and lower ridges 92 to penetrate the side surfaces 72 and 74 of the sockets 68 and 70 as the contact surfaces 84 and 86 move into abutting engagement with one another. As a result, the thus-expanded coupling member 66 interlocks the component parts 62 and 64, and, since there are two or more sets thereof, the parts 62 and 64 are interlocked and inseparably joined at spaced locations in a manner similar to that shown in FIGURES 1 to 3 inclusive.

The further modified composite workpiece, generally designated 100, shown in FIGURE 7 is produced from upper and lower component parts 102 and 104 also formed from sintered powdered material in a manner similar to that described above and joined with the aid of further modified elongated tubular coupling members 106 (FIGURE 8). The upper and lower component parts 102 and 104 are provided with sets of upper and lower aligned sockets 108 and 110, one set only being shown, and have upper and lower contact or abutment surfaces 112 and 114 respectively. The sockets 108 and 110 are of annular cylindrical shape with central inner bosses 116 and 118, outer cylindrical side surfaces 120 and 122 and inner cylindrical side surfaces 124 and 126 respectively, separated by annular bottom surfaces 128 and 130. The outer side surfaces 120 and 122 are of greater height than the inner side surfaces 124 to 126 so that upon assembly of the component parts 102 and 104, the top surfaces of the central bosses 116 and 118 are spaced apart from one another (FIGURE 7).

Each set of aligned annular sockets 108 and 110 contains an elongated tubular coupling member 106, each of which has a central hollow cylindrical body portion 132 and alternating outwardly-projecting and inwardly-projecting sharp-pointed prongs 134 and 136 respectively at its opposite ends 138 and 140. The prongs 134 and 136 initially lie within outer and inner diameters providing slight clearances between the outer and inner side surfaces 120, 122 and 124, 126 so as to permit free insertion of the opposite ends 138 and 140 of the coupling member 106 in its respective upper and lower sockets 108 and 110. The prongs 134 and 136 also extend upward at a sharper angle than shown in FIGURE 7 and as shown in FIGURES 8 and 9, so that they hold the upper and lower component parts 102 and 104 in vertically-spaced relationship before pressing occurs, in a manner similar to that shown in FIGURE 4.

When pressing is carried out, the bottom surfaces 128 and 130 engage and flatten out and spread apart the prongs 134 and 136 at the same time causing their pointed ends to penetrate the outer side surfaces 120 and 122 and the inner side surfaces 124 and 126 as the contact or abutment surfaces 112 and 114 approach one another and finally come into mutual engagement. In this manner also the component parts 102 and 104 are firmly and inseparably joined to one another at spaced locations in a manner similar to that shown in FIGURE 2, so that they cannot accidentally come apart.

In any of the foregoing embodiments of the invention, the indentation of the component parts by their respective coupling members is facilitated by the fact that the component parts are composed of sintered powdered material of a porous consistency which yields and facilitates penetration.

I claim:
1. An article of manufacture, comprising
   a pair of component parts of sintered powdered material having matable junction walls and alignable sockets with coupling side walls extending into said parts from said junction walls,
      said parts within said sockets having wedging protuberances projecting toward one another from the bottoms of said sockets,
   and a tubular coupling member disposed in said aligned sockets and having opposite ends adapted to indent said side walls of said sockets in response to the flattening and expansion of said opposite ends by the mating engagement of said component parts and the simultaneous expanding action of said wedging protuberances upon said opposite ends.
2. An article of manufacture, according to claim 1, wherein said wedging protuberances are of approximately conical configuration.

3. An article of manufacture, according to claim 2, wherein the bases of said protuberances in said sockets are spaced laterally inward from said socket side walls.

4. An article of manufacture, according to claim 3, wherein said coupling member has its opposite ends extending into the space between said protuberances and said coupling side walls.

5. An article of manufacture, according to claim 1, wherein said opposite ends of said coupling member have sharp outer edges thereon.

6. An article of manufacture, according to claim 5, wherein said opposite ends have laterally-projecting ridges and wherein said sharp edges are disposed on said ridges.

References Cited

UNITED STATES PATENTS

| | | |
|---|---|---|
| 1,150,358 | 8/1915 | Gilmer. |
| 1,391,163 | 9/1921 | Bancroft. |
| 1,555,242 | 9/1925 | Foster. |
| 2,549,939 | 4/1951 | Shaw et al. _____ 151—7 |
| 2,558,132 | 6/1951 | Green _____ 85—14 |
| 2,849,765 | 9/1958 | De Sena _____ 85—14 |

MARION PARSONS, JR., Primary Examiner

U.S. Cl. X.R.

85—14, 39, 63; 151—41.74